(12) United States Patent
Zuo et al.

(10) Patent No.: US 11,703,067 B1
(45) Date of Patent: Jul. 18, 2023

(54) TWO-DIMENSIONAL MOTOR-DIRECT-DRIVING ELECTRO-HYDRAULIC SERVO VALVE WITH ADJUSTABLE NULL POSITION

(71) Applicants: HANGZHOU CITY UNIVERSITY, Hangzhou (CN); SHANGHAI MARINE EQUIPMENT RESEARCH INSTITUTION, Hangzhou (CN)

(72) Inventors: Qiang Zuo, Hangzhou (CN); Xian Zhang, Shanghai (CN); Yaolan Jin, Shanghai (CN); Zhuhua Deng, Hangzhou (CN); Wei Shao, Hangzhou (CN); Pengfei Wang, Hangzhou (CN); Jie Xiong, Hangzhou (CN); Liying Lou, Hangzhou (CN); Yanwei Zhao, Hangzhou (CN); Longlong Leng, Hangzhou (CN)

(73) Assignees: HANGZHOU CITY UNIVERSITY, Hangzhou (CN); SHANGHAI MARINE EQUIPMENT RESEARCH INSTITUTE, Shanghai (CN)

( * ) Notice: Subject to any disclaimer, the term of this patent is extended or adjusted under 35 U.S.C. 154(b) by 0 days.

(21) Appl. No.: 17/956,947

(22) Filed: Sep. 30, 2022

(30) Foreign Application Priority Data

May 24, 2022 (CN) .......................... 202210566558.0

(51) Int. Cl.
- *F15B 13/04* (2006.01)
- *F16K 31/04* (2006.01)
- *F16K 27/04* (2006.01)
- *F15B 13/044* (2006.01)

(52) U.S. Cl.
CPC ...... *F15B 13/0402* (2013.01); *F15B 13/0444* (2013.01); *F16K 27/041* (2013.01); *F16K 31/047* (2013.01)

(58) Field of Classification Search
CPC .............. F15B 13/0402; F15B 13/0444; F16K 27/041; F16K 31/047; F16K 31/04; F16K 11/0708

See application file for complete search history.

(56) References Cited

U.S. PATENT DOCUMENTS

| | | |
|---|---|---|
| 2004/0238051 A1 | 12/2004 | Tranovich |
| 2011/0048562 A1 | 3/2011 | Kannoo |

FOREIGN PATENT DOCUMENTS

| | | |
|---|---|---|
| CN | 102168700 A | 8/2011 |
| CN | 106438551 A | 2/2017 |
| CN | 108591152 A | 9/2018 |
| CN | 112324945 A | 2/2021 |
| CN | 114396406 A | 4/2022 |

*Primary Examiner* — Kelsey E Cary

(57) ABSTRACT

An electro-hydraulic servo valve, which has an adjustable null position and can be directly driven by the motor, is provided and includes four parts: a slide valve assembly, a two-dimensional motor, a magnet resetting-to-null mechanism, and a displacement sensor, and the four parts are set coaxially arranged. The slide valve assembly is a conventional two-dimensional servo valve structure. The two-dimensional motor may directly drive the valve core to rotate to further control a size of an opening opened by a valve. The magnet resetting-to-null mechanism is configured to reset the valve to the null position. The displacement sensor may monitor a position of the valve core in real-time and feedback signals to achieve closed-loop controlling.

6 Claims, 3 Drawing Sheets

TWO-DIMENSIONAL MOTOR-DIRECT-DRIVING ELECTRO-HYDRAULIC SERVO VALVE WITH ADJUSTABLE NULL POSITION

CROSS REFERENCE TO RELATED APPLICATIONS

The present application claims the priority of the Chinese patent application No. 202210566558.0, filed on May 24, 2022, and the entire contents of which are hereby incorporated by reference in their entireties.

TECHNICAL FIELD

The present disclosure relates to the field of motors, and in particular to a two-dimensional motor-direct-driving electro-hydraulic servo valve with an adjustable null position.

BACKGROUND

A servo valve is an electro-hydraulic conversion element and a power amplifying element. The servo valve connects an electrical part with a hydraulic part to convert and amplify an electro-hydraulic signal. Performance of the servo valve significantly determines performance of the entire electro-hydraulic control system. Compared to an ordinary servo valve, a two-dimensional servo valve has various advantages, such as having a high flow rate, being small sized, having a high frequency response, being highly resistant to pollution, having a simple structure and having a low cost.

During long-term research, the applicant discovers that the two-dimensional servo valve in the art drives a transmission mechanism through a motor, the transmission mechanism further drives a body of the servo valve to move. However, for the two-dimensional servo valve in the art, resetting the servo valve into a null position may be achieved by a spring. Therefore, various problems, such as complex electrical-mechanical conversion, contact wear, high pressure dynamic sealing, and so on, may occur.

SUMMARY OF THE DISCLOSURE

The present disclosure provides a two-dimensional motor-direct-driving electro-hydraulic servo valve with an adjustable null position to solve the problems of complex electrical-mechanical conversion, contact wear, high pressure dynamic sealing, which are caused by the body of the two-dimensional servo valve being connected to the motor through the transmission mechanism and taking the spring to reset to the null position.

According to a first aspect, a two-dimensional motor-direct-driving electro-hydraulic servo valve with an adjustable null position is provided and includes a slide valve assembly, a two-dimensional motor, a magnet resetting-to-null mechanism and a displacement sensor, wherein the slide valve assembly, the two-dimensional motor, the magnet resetting-to-null mechanism and the displacement sensor are coaxially arranged.

The slide valve assembly comprises a valve body, a valve sleeve, a valve core, a concentric ring and an end cap, an end of the valve core and the sleeve defines a servo spiral groove, communicating with a sensitivity cavity, serving as a pilot valve. The valve core may rotate for a certain angle and at the same time axially move for a certain distance.

The two-dimensional motor is arranged at an end of the valve body and is configured to drive the valve core to rotate.

The magnet resetting-to-null mechanism is arranged at an end of the two-dimensional motor and is configured to reset the valve core to the null position.

The displacement sensor is disposed at an end of the magnet resetting-to-null mechanism and is configured to measure the axial displacement of the valve core and to feedback a position of the valve core to the motor in real time, achieving a closed-loop control.

In some embodiments, the slide valve assembly defines five cavities, each of two side cavities of the five cavities is a high-pressure cavity, a middle cavity of the five cavities is a low-pressure cavity, and the rest two cavities of the five cavities are a first operating cavity and a second operating cavity respectively. A central hole is defined in the valve core along a central axis of the valve core and is communicated with the low-pressure cavity. A side of the valve core near the two-dimensional motor defines a small hole to allow a cavity where the motor rotor is arranged to the low-pressure cavity.

In some embodiments, a right side of the valve core is arranged with a stage shoulder, an outer wall surface of the stage shoulder defines a pressure equalization groove, and the stage shoulder defines a through hole in an axial direction of the shoulder, such that liquid in the high-pressure cavity may be guided into a space at a left of the concentric ring.

In some embodiments, the slide valve assembly defines five cavities, each of two side cavities of the five cavities is a high-pressure cavity, a middle cavity of the five cavities is a low-pressure cavity, and the rest two cavities of the five cavities are a first operating cavity and a second operating cavity respectively. A central hole is defined in the valve core along a central axis of the valve core and is communicated with the low-pressure cavity. A side of the valve core near the two-dimensional motor defines a small hole to allow a cavity where the motor rotor is arranged to the low-pressure cavity.

In some embodiments, a surface of the end cap contacting the sensitivity cavity defines a first recess, and a surface of the concentric ring contacting the high-pressure cavity defines a second recess.

In some embodiments, the two-dimensional motor includes a motor stator, a motor rotor, a motor left end cap, a motor right end cap and a controller.

The motor rotor takes the valve core as a rotation shaft, and directly sleeves the valve core. Rotation of the motor rotor may directly drive the valve core to rotate.

The motor stator sleeves the motor rotor and is coaxial with the motor rotor. An axial width of the motor stator is greater than an axial width of the motor rotor. Therefore, when the motor rotor is moving axially, the motor rotor remains within the axial width of the motor stator.

A first circular protrusion and a second circular protrusion are concentric and are arranged on two opposite sides of the left end cap respectively. The first circular protrusion is inserted into the valve sleeve, and the second circular protrusion is inserted into an inner side of the motor stator. The right end cap of the motor is arranged with a third circular protrusion, inserted into an inner side of the motor stator. In this way, the valve core, the motor rotor and the motor stator may be concentric.

The controller is configured to control rotation of the motor rotor, i.e., rotation of the valve core, such that controlling the size of the opening of the valve may be achieved based on the principle of the two-dimensional valve.

A thin-walled cover is embedded in an inner wall of the motor stator. A portion of the second circular protrusion, which is inserted into the inner side of the motor stator, defines a first seal ring groove. A portion of the third circular protrusion, which is inserted into the inner side of the motor stator, defines a second seal ring groove. The first seal ring groove and the second seal ring groove allows the rotor cavity to be separated from the stator of the motor, achieving a wet rotor structure.

The magnet resetting-to-null mechanism includes a rotating resetting-to-null structure and an axial resetting structure.

The rotating resetting-to-null structure is configured to reset the valve core to the null position in circumferential rotation. When there is pressure in a system of the slide valve assembly, after the two-dimensional motor is disconnected, the rotating resetting-to-null structure may enable the valve core to be reset to the initial null position.

The axial resetting structure is configured to reset the valve core in the axial direction. When there is no pressure in the system of the slide valve assembly, the axial resetting structure may allow the opening of the valve to be closed.

The rotating resetting-to-null structure includes a setting-to-null plate, a rotating dynamic magnet, a first rotating static magnet and a second rotating static magnet. A screw hole is defined in the setting-to-null plate. The setting-to-null plate is screwed to the right end cap of the motor. The screw hole in the setting-to-null plate is circular ring-shaped. When the setting-to-null plate is connected to the right end cap of the motor, the setting-to-null plate may be rotated for a certain angle before being screwed to the right end cap of the motor.

The rotating dynamic magnet is inserted into the hole of the valve core and is mounted symmetrically about an axis of the valve core.

The first rotating static magnet and the second rotating static magnet are inserted in two symmetrical holes of the setting-to-null plate respectively.

A distance between an end surface of the rotating dynamic magnet and an end surface of the first rotating static magnet is equal to a distance between another end surface of the rotating dynamic magnet and an end surface of the second rotating static magnet, and the distance is relatively small. A pole of the end surface of the rotating dynamic magnet is opposite to and attractive to the end surface of the first rotating static magnet, and a pole of the another end surface of the rotating dynamic magnet is opposite to and attractive to the end surface of the second rotating static magnet.

The axial resetting structure includes a first axial dynamic magnet, a second axial dynamic magnet, a first axial static magnet, a second axial static magnet, a first magnetic isolation pad and a second magnetic isolation pad.

The first magnetic isolation pad and the second magnetic isolation pad sleeve the valve core and are attached to two sides of the motor rotor respectively.

The first axial dynamic magnet and the second axial dynamic magnet are coaxial with the valve core and are adhered to an end surface of the first magnetic pad and an end surface of the second magnetic pad respectively.

The first static magnet and the second static magnet are adhered to the left end cap of the motor and the setting-to-null plate respectively. The first axial static magnet and the first axial dynamic magnet form a pair of magnets, the second axial static magnet and the second axial dynamic magnet form another pair of magnets. The pair of magnets are the same as the another pair of magnets. For each pair, the two magnets are repulsive to each other, achieving a resetting effect similar to. a spring.

In some embodiments, the servo valve opening may have a dead zone. During operating, based on the position signal of the valve core fed back by the displacement sensor, the controller may control the valve core to quickly jump over the dead zone.

According to the present disclosure, an electro-hydraulic servo valve, which has an adjustable null position and can be directly driven by the motor, is provided. The servo valve directly drives the valve core by the two-dimensional motor. The transmission mechanism for a traditional two-dimensional valve may be omitted, an electrical-mechanical conversion process may be simplified. The magnet resetting-to-null mechanism is arranged to allow the two-dimensional valve to be set to the null position and to be reset in the axial direction without contact, reducing the contact wear and avoiding the high-pressure dynamic sealing problem, such that service life of the servo valve may be improved. In addition, the cover made of high strength materials such as titanium alloy may be arranged to separate the rotor cavity from the stator. The rotor cavity may be communicated with the low-pressure cavity to form a wet rotor structure, increasing heat dissipation, avoiding the problem of high-pressure dynamic sealing, and improving reliability of the entire servo valve.

BRIEF DESCRIPTION OF THE DRAWINGS

In order to illustrate more clearly technical solutions of embodiments of the present disclosure, the accompanying drawings to be used in the description of the embodiments will be described briefly in the following. Apparently, the following drawings show only some embodiments of the present disclosure. Any ordinary skilled person in the art may obtain other drawings based on the following drawings without making creative work.

Figure 1:
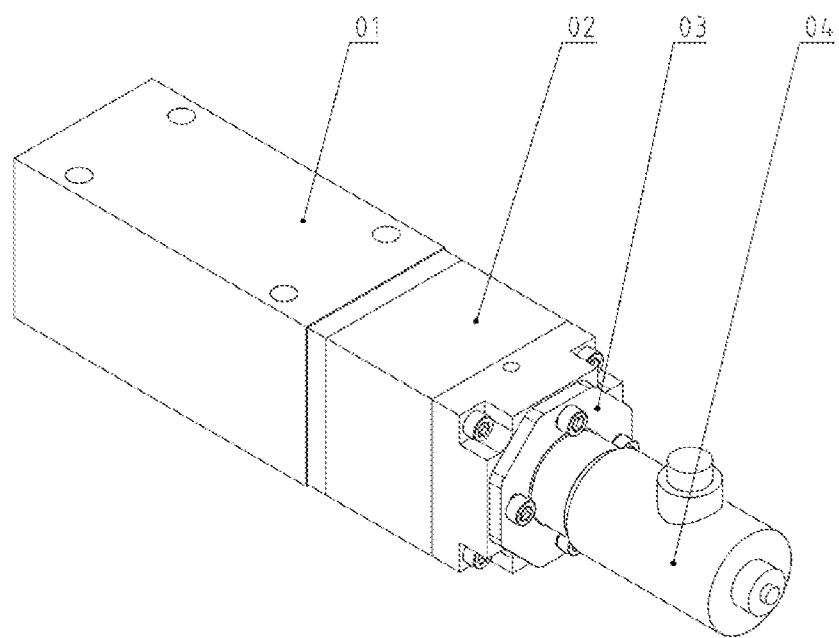
FIG. 1 is a perspective view of a two-dimensional motor-direct-driving electro-hydraulic servo valve with an adjustable null position according to an embodiment of the present disclosure.

In the drawings: 01. Slide valve assembly; 02. Two-dimensional motor; 03. Magnet resetting-to-null mechanism; 04. Displacement sensor; 11. Valve body; 12. Valve sleeve; 13. Valve core; 131. Hole; 132. Central hole; 133. Small; 134. Stage shoulder; 135. Pressure equalization groove; 136. Through hole; 14. End cover; 15. Concentric ring; 21. Motor stator; 211. Thin-walled cover; 22. Motor rotor; 23. Left end cover for the motor; 231. First circular protrusion; 232. Second circular protrusion; 233. First seal ring groove; 24. Right end cover for the motor; 241. Third circular protrusion; 242. Second seal ring groove; 25. Controller; 311. Setting-to-null plate; 3111. Symmetrical hole; 3112. Screw hole; 312. Rotating dynamic magnet; 3121. First upper end surface; 3122. First lower end surface; 313. First rotating static magnet; 3131. Second upper end surface; 314. Second rotating static magnet; 3141. Second lower end surface; 321. First axial-directional static magnet; 322. First axial-directional dynamic magnet; 323. First magnetic isolation pad; 324. Second magnetic isolation pad; 325. Second axial-directional dynamic magnet; 326. Second axial-directional static magnet; 41. Body of the sensor; 42. Movable connecting rod having an iron core; P. high-pressure cavity; T. low-pressure cavity; A. first operating cavity; B. second operating cavity; S. sensitivity cavity.

DETAILED DESCRIPTION

Technical solutions in the embodiments of the present disclosure will be clearly and completely described below by referring to the accompanying drawings in the embodiments of the present disclosure. Obviously, the embodiments described show only some of but not all of the embodiments of the present disclosure. Based on the embodiments in the present disclosure, all other embodiments obtained without creative work by any ordinary skilled person in the art shall fall within the scope of the present disclosure.

The terms "first" and "second" are used for descriptive purposes only and shall not be interpreted as indicating or implying relative importance or implicitly specifying the number of technical features indicated. In the present application, the term "plurality" means at least two, such as two, three, and so on, unless otherwise expressly and specifically limited. Furthermore, terms "including", "having", and any variation thereof, are intended to cover non-exclusive inclusion. For example, a process, a method, a system, a product or an apparatus including a series of operations or units is not limited to the listed operations or units, but may further include operations or units not listed, or include operations or units that are inherent to the process, the method, the product or the apparatus.

Figure 2:
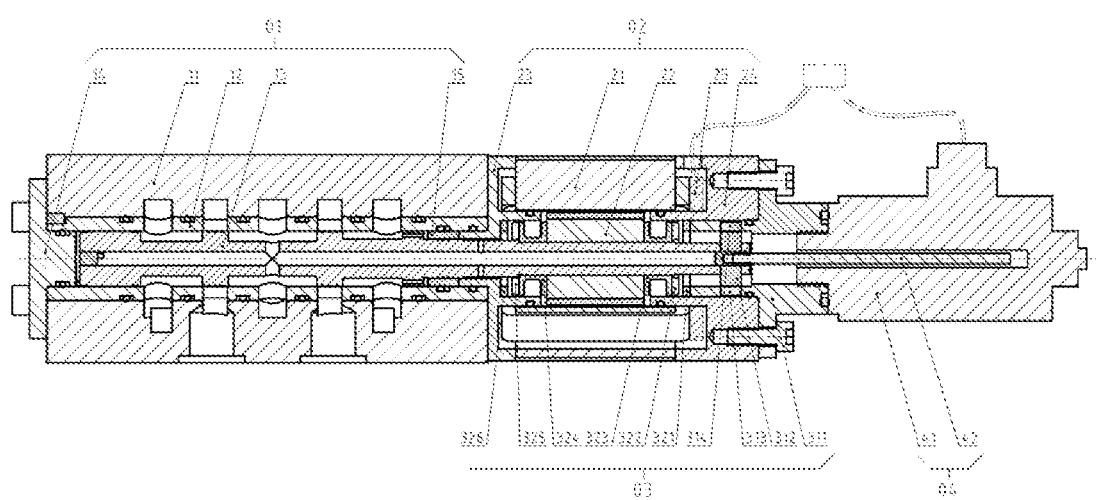
FIG. 2 is a cross sectional view of a two-dimensional motor-direct-driving electro-hydraulic servo valve with an adjustable null position according to an embodiment of the present disclosure.

The present disclosure provides a two-dimensional motor-direct-driving electro-hydraulic servo valve with an adjustable null position. As shown in FIG. 1 and FIG. 2, the two-dimensional motor-direct-driving electro-hydraulic servo valve with an adjustable null position of the present disclosure includes four parts: a slide valve assembly 01, a two-dimensional motor 02, a magnet resetting-to-null mechanism 03, and a displacement sensor 04, and the four parts are set coaxially arranged. The slide valve assembly 01 is a conventional two-dimensional servo valve structure. The two-dimensional motor 02 may directly drive the valve core 13 to rotate to further control a size of an opening opened by a valve. The magnet resetting-to-null mechanism 03 is configured to reset the valve to the null position. The displacement sensor 04 may monitor a position of the valve core 13 in real-time and feedback signals to achieve closed-loop controlling. The two-dimensional servo valve in the art drives a transmission mechanism through the motor, the transmission mechanism further drives the body of the servo valve to move. However, for the two-dimensional servo valve in the art, resetting the servo valve into the null position may be achieved by a spring. Therefore, various problems, such as complex electrical-mechanical conversion, contact wear, high pressure dynamic sealing, and so on, may occur. In the present disclosure, the servo valve directly drives the valve core 13 by the two-dimensional motor 02. The transmission mechanism for the traditional two-dimensional valve may be omitted, the electrical-mechanical conversion process may be simplified. The magnet resetting-to-null mechanism 03 is arranged to allow the two-dimensional valve to be set to the null position and to be reset in the axial direction without contact, reducing the contact wear, such that service life of the servo valve may be improved. In addition, a cover 211 made of high strength materials such as titanium alloy may be arranged to separate the rotor cavity from the stator of the tow-dimensional motor 02. The rotor cavity may be communicated with the low-pressure cavity to form a wet rotor structure, increasing heat dissipation, avoiding the problem of high-pressure dynamic sealing, and improving reliability of the entire servo valve.

In the present embodiment, the slide valve assembly 01 includes a valve body 11, a valve sleeve 12, a valve core 13, an end cap 14 and a concentric ring 15. A left of the valve core 13 and a left the valve sleeve 12 (the left refers to the left of the drawings) defines a servo spiral groove (not shown in the drawings), and the servo spiral groove is communicated with a sensitivity cavity S, serving as a pilot valve. Therefore, when the valve core 13 rotates for a certain angle, the valve core 13 may move axially for a certain distance. Therefore, the size of the opening of the valve may be controlled by controlling the angle that the valve core 13 rotates.

Figure 3:
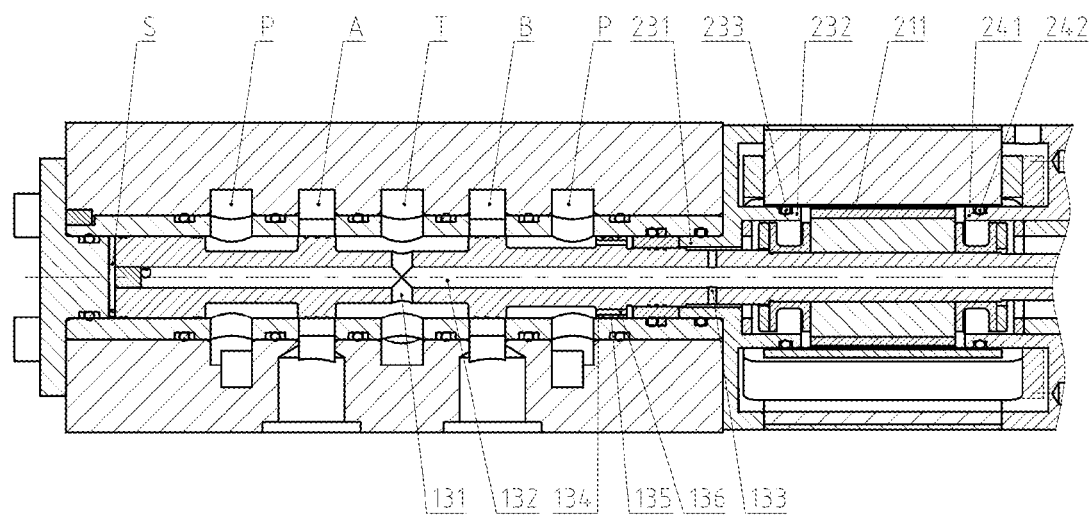
FIG. 3 is a cross sectional view of channel cavities of the electro-hydraulic servo valve according to an embodiment of the present disclosure.

In the present embodiment, as shown in FIG. 3, the slide valve assembly 01 defines five cavities. Each of a left cavity and a right cavity of the five cavities is a high-pressure cavity P, and a middle cavity of the five cavities is a low-pressure cavity T. The rest two cavities of the five cavities are a first operating cavity A and a second operating cavity B. A central hole 132 is defined in the valve core 13 along a central axis and is communicated with the middle low-pressure cavity T through a hole 131. A side of the valve core 13 near the two-dimensional motor defines a small hole 133 to allow a cavity where the motor rotor 22 is arranged to the low-pressure cavity T.

In the present embodiment, a right side of the valve core 13 is arranged with a stage shoulder 134. An outer wall surface of the stage shoulder 134 defines a pressure equalization groove 135. The stage shoulder 134 defines a through hole 136 in an axial direction of the shoulder. In this way, the high-pressure cavity P may be guided to a left side of the concentric ring 15. In this case, the shoulder 134 may serve as a bearing support.

Figure 4:
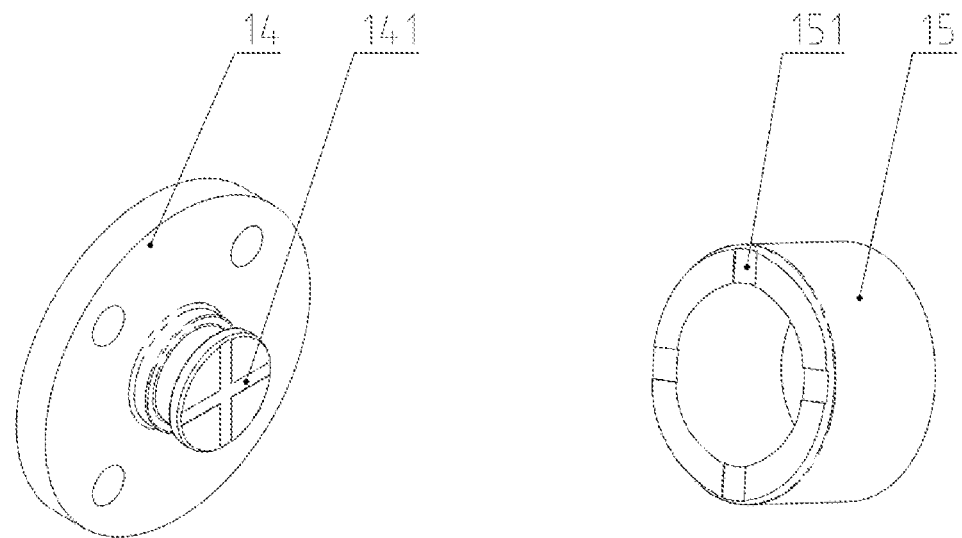
FIG. 4 is a perspective view of some elements of the electro-hydraulic servo valve according to an embodiment of the present disclosure.

In the present embodiment, as shown in FIG. 4, a surface of the end cap 14 contacting the sensitivity cavity S defines a first recess 141, and a surface of the concentric ring 15 contacting the high-pressure cavity P defines a second recess 151. In this way, when the valve core 13 moves to an extreme position at each of two ends, the valve core 13 may still establish pressure feedback, such that the valve core 13 may still operate normally.

In the present embodiment, the two-dimensional motor 02 includes a motor stator 21, a motor rotor 22, a motor left end cap 23, a motor right end cap 24 and a controller 25. The motor rotor 22 takes the valve core 13 as a rotation shaft, and directly sleeves the valve core 13 by glue or interference fitting. Rotation of the motor rotor 22 may directly drive the valve core 13 to rotate. The motor stator 21 sleeves the motor rotor 22 and is coaxial with the motor rotor 22. An axial width of the motor stator 21 is greater than an axial width of the motor rotor 22. Therefore, when the motor rotor 22 is moving axially, the motor rotor 22 remains within the axial width of the motor stator 21, ensuring the torque of the two-dimensional motor 02 to be stable while the two-dimensional motor 02 is operating.

In the present embodiment, a first circular protrusion 231 and a second circular protrusion 232 are concentric and are arranged on two opposite sides of the left end cap 23 respectively. The first circular protrusion 231 is inserted into the valve sleeve 12, and the second circular protrusion 232 is inserted into an inner side of the motor stator 21. The right end cap 24 of the motor is arranged with a third circular protrusion 241, inserted into an inner side of the motor stator 21. In this way, the valve core 13, the motor rotor 22 and the motor stator 21 may be concentric after being assembled together, a gap between the motor stator 21 and the motor rotor 22 in the radial direction may be uniform, and the two-dimensional motor 02 may operate stably. The controller 25 is configured to control rotation of the motor rotor 22, i.e., rotation of the valve core 13, such that controlling the size of the opening of the valve may be achieved based on the principle of the two-dimensional valve.

In the present embodiment, a thin-walled cover 211, which is made of high-strength material such as titanium alloy, is embedded in an inner wall of the motor stator 21. A portion of the second circular protrusion 232 of the left end cap 23, which is inserted into the inner side of the motor stator 21, defines a first seal ring groove 233. A portion of the third circular protrusion 241 of the right end cap 24, which is inserted into the inner side of the motor stator 21, defines a second seal ring groove 242. By arranging a seal ring, the rotor cavity may be separated from the stator of the motor 02, achieving a wet rotor structure.

In the present embodiment, since the gap between the motor stator 21 and the motor rotor 22 in the radial direction is relatively small, such as 0.5 mm, and in order to ensure the motor rotor 22 to rotate normally after being assembled, a thickness of the cover 211 in the inner wall of the motor stator 21 may be 0.3 mm. Although the cavity where the motor rotor 22 is arranged is the low-pressure cavity, a certain pressure is present, such as 0.5 MPa. Under certain circumstances, when the valve is damaged due to an external force, the pressure in the cavity where the motor rotor 22 is arranged may be increased, such as increased to reach 5 MPa. Therefore, the cover 211 is made of the high strength material such as titanium alloy. Although the cover 211 is thin, an outer wall of the cover 211 is closely fitting with a silicon steel wall of the motor stator 21 and is supported. Therefore, the cover 211 may withstand a certain amount of high pressure.

In the present embodiment, the magnet resetting-to-null mechanism 03 includes a rotating resetting-to-null structure and an axial resetting structure. The rotating resetting-to-null structure is configured to reset the valve core 13 to the null position in circumferential rotation. When there is pressure in a system of the slide valve assembly 01, after the two-dimensional motor 02 is disconnected, the rotating resetting-to-null structure may enable the valve core 13 to be reset to the initial null position. The axial resetting structure is configured to reset the valve core 13 in the axial direction. When there is no pressure in the system of the slide valve assembly 01, the axial resetting structure may allow the opening of the valve to be closed.

Figure 5:
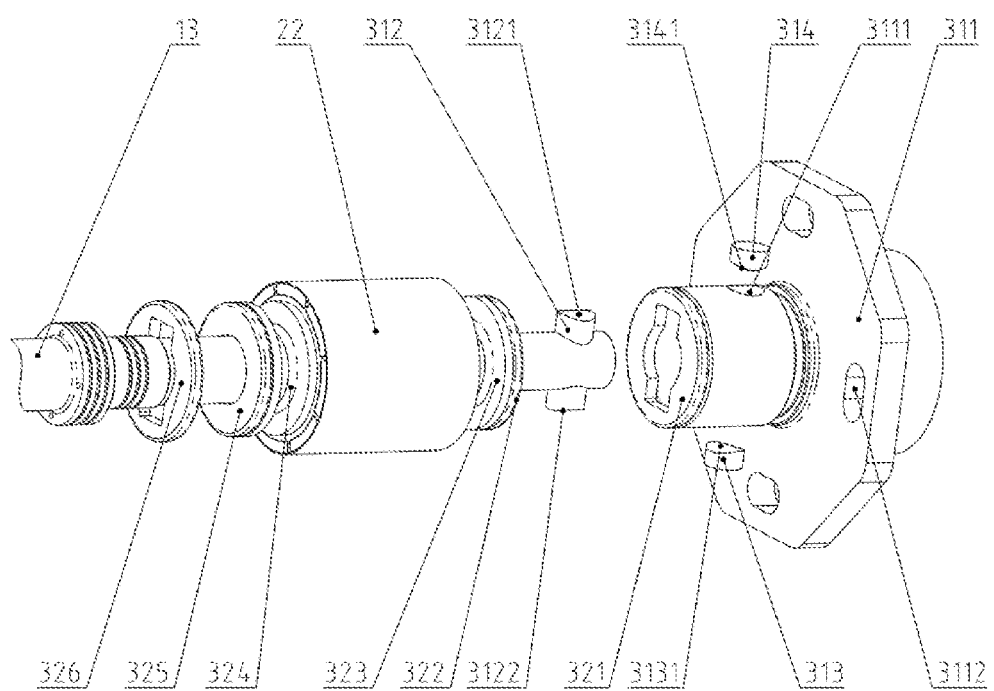
FIG. 5 is an exploded perspective view of a magnet resetting-to-null mechanism according to an embodiment of the present disclosure.

In the present embodiment, as shown in FIG. 5, the rotating resetting-to-null structure includes a setting-to-null plate 311, a rotating dynamic magnet 312, a first rotating static magnet 313 and a second rotating static magnet 314. The setting-to-null plate 311 is screwed to the right end cap 24 of the motor. A screw hole 3112 in the setting-to-null plate 311 is circular ring-shaped. When the setting-to-null plate 311 is connected to the right end cap 24 of the motor, the setting-to-null plate 311 may be rotated for a certain angle before being screwed to the right end cap 24 of the motor. The rotating dynamic magnet 312 is glued and fixedly inserted into the hole of the valve core 13 and is mounted symmetrically about an axis of the valve core 13. The first rotating static magnet 313 and the second rotating static magnet 314 are inserted in two symmetrical holes 3111 of the setting-to-null plate 311 respectively.

In the present embodiment, a distance between an end surface of the rotating dynamic magnet 312 and an end surface of the first rotating static magnet 313 is equal to a distance between another end surface of the rotating dynamic magnet 312 and an end surface of the second rotating static magnet 314, and the distance is relatively small. A pole of the end surface of the rotating dynamic magnet 312 is opposite to a pole the end surface of the first rotating static magnet 313, and therefore the end surfaces are attractive to each other. A pole of the another end surface of the rotating dynamic magnet 312 is opposite to the end surface of the second rotating static magnet 314, and therefore, the end surfaces are attractive to each other. That is, as shown in FIG. 5, a distance between a first upper end surface 3121 of the rotating dynamic magnet 312 and a second lower end surface 3141 of the second rotating static magnet 314 is equal to a distance between a first lower end surface 3122 of the rotating dynamic magnet 312 and a second upper end surface 3131 of the first rotating static magnet 313, and the distance is relatively small, such ash 0.2 mm, such that a greater magnetic force may be achieved. All three magnets are magnetized in a vertical direction. For example, the first upper surface 3121 may be N-pole, the first lower surface 3122 may be S-pole, the third lower surface 3141 may be S-pole, and the second upper surface 3131 may be N-pole.

In the present embodiment, since the distance between the rotating dynamic magnets and the static magnets is small, in order to avoid interference during rotation, the first upper surface 3121 and the first lower surface 3122 of the rotating dynamic magnet 312, and the second lower surface 3141 of the second rotating static magnet 314 and the second upper surface 3131 of the first rotating static magnet 313 may be arranged as cylindrical surfaces, and an axial center of each of the cylindrical surfaces coincides with an rotation axis.

In the present embodiment, when starting assembling, the valve is pressurized, and the setting-to-null plate 311 is rotated. The valve core 13 may rotate and move axially under a magnetic torque, slowly adjusting the opening of the valve to be null, i.e. an initial null position of the valve core 13. Further, the setting-to-null plate 311 is fixed by screws. During operating, the valve core 13 is rotated away from the initial null position, and the valve core 13 will be subjected to a torque for resetting to the initial null position. However, a maximum value of the torque is less than a rated torque of the motor.

In the present embodiment, the axial resetting structure includes a first axial dynamic magnet 322, a second axial dynamic magnet 325, a first axial static magnet 321, a second axial static magnet 326, a first magnetic isolation pad 323 and a second magnetic isolation pad 324. The first magnetic isolation pad 323 and the second magnetic isolation pad 324 are adhered to or are interference-fitting with the valve core 13 and are attached to two sides of the motor rotor 22 respectively. The first axial dynamic magnet 322 and the second axial dynamic magnet 325 are coaxial with the valve core 13 and are adhered to an end surface of the first magnetic pad 323 and an end surface of the second magnetic pad 324 respectively. The first static magnet 321 and the second static magnet 326 are adhered to the left end cap 23 of the motor and the setting-to-null plate 311 respectively.

In the present embodiment, a magnetization direction of the first axial dynamic magnet 322 and the second axial dynamic magnet 325 and a magnetization direction of the first axial static magnet 321 and the second axial static magnet 326 are along the axial direction. The first axial dynamic magnet 322 and the first axial static magnet 321 form a pair of magnets. The second axial dynamic magnet 325 and the second axial static magnet 326 form another pair of magnets. Further, for each pair, the two magnets may be repulsive to each other. At the axial null position, the distance between the two magnets of one pair may be equal to the distance between the two magnets of another pair. When the first axial dynamic magnet 322 and the second axial dynamic magnet 325 move axially with the valve core, the distance between the two magnets in one pair increases, and the distance between the two magnets in the other pair decreases. Therefore, a force that drives the valve core to the initial axial null position may be generated, achieving an effect similar to the spring.

In the present embodiment, the displacement sensor 04 includes a sensor body 41 and a movable iron-core connecting rod 42. The sensor body 41 is threadedly fixed to the setting-to-null plate 311. The movable iron-core connecting rod 42 is directly connected to the valve core 13. In this way, an axial displacement of the valve core 13, i.e. the size of the opening, may be measured directly. Further, the information of the position of the valve core 13 may be fed back to the motor controller 25 in real time, such that the size of the opening of the valve may be controlled precisely.

In the present embodiment, since rotational and axial resetting of the magnet resetting-to-null mechanism 03 cannot be 100% accurate, the valve opening may have a dead zone, such as 10% of the entire opening. That is, when the valve core 13 is displaced for ±1 mm, the valve core 13 has a 0.1 mm coverage at the valve opening at the initial null position. In this way, after the magnet resetting-to-null mechanism 03 is rotatably or axially reset, the opening of the valve is closed. During operating, based on the position signal of the valve core 13 fed back by the displacement sensor 04, the controller 24 may control the valve core 13 to quickly jump over the dead zone to achieve the performance of the electro-hydraulic servo valve.

The above description shows only embodiments of the present disclosure and does not limit the scope of the present disclosure. Any equivalent structure or equivalent process transformation performed based on the specification and the accompanying drawings of the present disclosure, directly or indirectly applied in other related fields, shall be equally covered by the present disclosure.

What is claimed is:

1. A two-dimensional motor-direct-driving electro-hydraulic servo valve with an adjustable null position, comprising a slide valve assembly, a two-dimensional motor, a magnet resetting-to-null mechanism and a displacement sensor, wherein the slide valve assembly, the two-dimensional motor, the magnet resetting-to-null mechanism and the displacement sensor are coaxially arranged;

wherein the slide valve assembly comprises a valve body, a valve sleeve, a valve core, a concentric ring and an end cap, an end of the valve core and the sleeve defines a servo spiral groove, communicating with a sensitivity cavity;

the two-dimensional motor is arranged at an end of the valve body;

the two-dimensional motor comprises a motor stator, a motor rotor, a left end cap, a right end cap and a controller; the motor rotor directly sleeves the valve core and takes the valve core as a rotation shaft of the rotor; the motor stator sleeves the motor rotor and is coaxially arranged with the motor rotor, an axial width of the motor stator is greater than an axial width of the motor rotor; a first circular protrusion and a second circular protrusion are concentric and are arranged on two opposite sides of the left end cap; the first circular protrusion is inserted into the valve sleeve, and the second circular protrusion is inserted into an inner side of the motor stator; a side of the motor right end cap is arranged with a third circular protrusion, inserted into an inner side of the motor stator; and the controller is configured to control rotation of the motor rotor;

the magnet resetting-to-null mechanism is arranged at an end of the two-dimensional motor;

the magnet resetting-to-null mechanism comprises: a rotating resetting-to-null structure and an axial resetting structure; the rotating resetting-to-null structure is configured to reset the valve core in circumferential rotation; and the axial resetting structure is configured to reset the valve core in an axial direction;

the rotating setting-to-null structure further comprises: a setting-to-null plate, a rotating dynamic magnet, a first rotating static magnet and a second rotating static magnet; the setting-to-null plate is defines a screw hole and is screwed to the right end cap of the motor, the screw hole is circular-ring shaped; the rotating dynamic magnet is inserted in the valve core and is mounted symmetrically about an axis of the valve core; the first rotating static magnet and the second rotating static magnet are inserted in two symmetrical holes of the setting-to-null plate respectively; the rotating dynamic magnet is arranged facing the first rotating static magnet and the second rotating static magnet in a radial direction; a distance between an end surface of the rotating dynamic magnet and an end surface of the first rotating static magnet is equal to a distance between another end surface of the rotating dynamic magnet and an end surface of the second rotating static magnet, and the distance is relatively small; a pole of the end surface of the rotating dynamic magnet is opposite to a pole of the end surface of the first rotating static magnet, and a pole of the another end surface of the rotating dynamic magnet is opposite to a pole of the end surface of the second rotating static magnet;

the axial resetting structure further comprises: a first axial dynamic magnet, a second axial dynamic magnet, a first axial static magnet, a second axial static magnet, a first magnetic isolation pad and a second magnetic isolation pad; the first magnetic isolation pad and the second magnetic isolation pad are adhered to or interference-fitting with the valve core and are attached to two sides of the motor rotor respectively; the first axial dynamic magnet and the second axial dynamic magnet are coaxial with the valve core and are attached to an end surface of the first magnetic isolation pad and an end surface of the second magnetic isolation pad respectively; the first axial static magnet and the second axial static magnet are attached to the left end cap of the motor and to the setting-to-null plate respectively; the first axial static magnet and the first axial dynamic magnet form a pair of magnets, the second axial static magnet and the second axial dynamic magnet form another pair of magnets, and the pair of magnets are the same as the another pair of magnets; and the displacement sensor is disposed at an end of the magnet resetting-to-null mechanism.

2. The servo valve according to claim 1, wherein the slide valve assembly defines five cavities, each of two side cavities of the five cavities is a high-pressure cavity, a middle cavity of the five cavities is a low-pressure cavity, and the rest two cavities of the five cavities are a first operating cavity and a second operating cavity respectively;

a central hole is defined in the valve core along a central axis of the valve core and is communicated with the low-pressure cavity;

a side of the valve core near the two-dimensional motor defines a small hole to allow a cavity where the motor rotor is arranged to the low-pressure cavity.

3. The servo valve according to claim 1, wherein a right side of the valve core is arranged with a stage shoulder, an outer wall surface of the stage shoulder defines a pressure equalization groove, the stage shoulder defines a through hole in an axial direction of the shoulder.

4. The servo valve according to claim 2, wherein a surface of the end cap contacting the sensitivity cavity defines a first recess, and a surface of the concentric ring contacting the high-pressure cavity defines a second recess.

5. The servo valve according to claim 1, wherein a thin-walled cover is embedded in an inner wall of the motor stator;

a portion of the second circular protrusion, which is inserted into the inner side of the motor stator, defines a first seal ring groove; and a portion of the third circular protrusion, which is inserted into the inner side of the motor stator, defines a second seal ring groove.

6. The servo valve according to claim 1, wherein an opening of the two-dimensional motor-direct-driving electro-hydraulic servo valve with the adjustable null position has a dead zone.

* * * * *